US012775877B2

(12) United States Patent
Kurian et al.

(10) Patent No.: US 12,775,877 B2
(45) Date of Patent: Oct. 27, 2026

(54) BIAS REDUCTION IN ARTIFICIAL INTELLIGENCE BY LEVERAGING OPEN SOURCE AI AND CLOSED SOURCE AI INTERACTIONS

(71) Applicant: Bank of America Corporation, Charlotte, NC (US)

(72) Inventors: Manu Kurian, Dallas, TX (US); Ana Maxim, Arlington, VA (US); Vinesh Patel, London (GB); Michael Young, Davidson, NC (US)

(73) Assignee: Bank of America Corporation, Charlotte, NC (US)

( * ) Notice: Subject to any disclaimer, the term of this patent is extended or adjusted under 35 U.S.C. 154(b) by 644 days.

(21) Appl. No.: 18/225,226

(22) Filed: Jul. 24, 2023

(65) Prior Publication Data

US 2025/0037003 A1 Jan. 30, 2025

(51) Int. Cl.

*G06N 20/00* (2019.01)
*G06F 8/71* (2018.01)
*G06F 16/215* (2019.01)
*G06F 16/2457* (2019.01)
*G06F 16/35* (2025.01)

(Continued)

(52) U.S. Cl.

CPC ............... *G06N 20/00* (2019.01); *G06F 8/71* (2013.01); *G06F 16/215* (2019.01); *G06F 16/24578* (2019.01); *G06F 16/35* (2019.01); *G06F 16/38* (2019.01); *G06F 16/80* (2019.01); *G06F 16/951* (2019.01); *G06F 16/9535* (2019.01); *G06F 16/958* (2019.01); *G06F 40/30* (2020.01); *G06F 2216/03* (2013.01); *G06N 3/08* (2013.01); *G06N 5/02* (2013.01)

(58) Field of Classification Search

CPC ............... G06F 16/215; G06F 16/9535; G06F 16/24578; G06F 16/951; G06F 16/958; G06F 40/30; G06F 16/35; G06F 2216/03; G06F 16/38; G06F 8/71; G06F 16/80; G06N 20/00; G06N 5/02; G06N 3/08

See application file for complete search history.

(56) References Cited

U.S. PATENT DOCUMENTS

2018/0300427 A1* 10/2018 Harbison .......... G06F 16/90335
2021/0158221 A1* 5/2021 Marlin .................. G06F 11/079

(Continued)

*Primary Examiner* — Quoc A Tran
(74) *Attorney, Agent, or Firm* — Weiss & Arons LLP

(57) ABSTRACT

Artificial intelligence (AI) systems may manipulate search results about an entity to inject a predetermined bias into the search results. A bias reduction artificial intelligence (AI) system and method may perform the same automated search about the entity on open source and closed source AI systems. The AI-generated search results for the open and closed source AI systems may be compared to determine differences in results. The differences may be analyzed to determine attempts by the AI systems to manipulate search results about the entity to inject predetermined bias. If an attempt at predetermined bias is identified, the bias reduction AI system may reduce the predetermined bias by sharing data about the entity between the open source AI system and the closed source AI system to cause the system to use machine learning to update the algorithms and the first and second data sets. Incentives may also be provided to the open and closed source AI systems to reduce biases.

20 Claims, 4 Drawing Sheets

(51) Int. Cl.

| | |
|---|---|
| ***G06F 16/38*** | (2019.01) |
| ***G06F 16/80*** | (2019.01) |
| ***G06F 16/951*** | (2019.01) |
| ***G06F 16/9535*** | (2019.01) |
| ***G06F 16/958*** | (2019.01) |
| ***G06F 40/30*** | (2020.01) |
| ***G06N 3/08*** | (2023.01) |
| ***G06N 5/02*** | (2023.01) |

(56) References Cited

U.S. PATENT DOCUMENTS

| | | | | |
|---|---|---|---|---|
| 2023/0274179 | A1* | 8/2023 | Tsang | G06F 40/205<br>706/12 |
| 2024/0311446 | A1* | 9/2024 | Jones | G06F 18/285 |
| 2025/0021916 | A1* | 1/2025 | Nandy | G06Q 10/06393 |

* cited by examiner

BIAS REDUCTION IN ARTIFICIAL INTELLIGENCE BY LEVERAGING OPEN SOURCE AI AND CLOSED SOURCE AI INTERACTIONS

FIELD OF THE DISCLOSURE

Aspects of the disclosure relate to enabling interactions of open source and closed source artificial intelligence (AI) systems to reduce biases in those systems.

BACKGROUND OF THE DISCLOSURE

Open source AI provides an AI platform in which the source code for the machine learning (ML) algorithm is publicly available. This enables the public to understand and collaborate on the AI/machine learning (ML) algorithm and to contribute improvements. The data used to train the ML model may also be publicly available. An open source AI system is a system that uses open source AI to generate ML models to be used for AI applications.

Closed source AI provides an AI platform in which the source code for the ML algorithm is not publicly available. A closed source AI system may use data that is privately maintained, such as by private businesses, to train the ML model. Some of the data used to train may be maintained as private and may be confidential. Closed source AI may be used by businesses that have gathered the data through business interactions with customers. A closed source AI system is a system that uses closed source AI to generate ML models to be used for AI applications.

Open source AI systems or closed source AI systems may have different biases built into their AI platforms. This may be due, for example, to the data or the machine learning algorithm that is used to train the model. Some biases may be unintended. In other instances, the bias toward a particular result may be intentional. The bias may result in obtaining search results obtained using an open source AI system that are different than search results obtained using a closed source AI systems. Some of the intentional biases may include undesirable biases toward a particular entity.

It would be desirable to have a way to produce improved AI-generated results in which the effects of biases of the AI system and, in particular, biases against an entity, are reduced.

SUMMARY OF THE DISCLOSURE

It is an object of this invention to identify whether attempts have been made to insert predetermined bias into open source or closed source AI systems to impact search results from either of these AI systems and to reduce the biases.

A bias reduction AI system may be provided in accordance with the present disclosure. The system may include a first interface to an open source AI system and a second interface to a closed source AI system. The system may include a bot that is configured to perform a first automated search, using the open source AI system, for information about an entity to obtain first results. The bot may be configured to perform a second automated search, using a closed source AI system, for information about the entity to obtain second results, wherein the first and second automated searches use the same terminology. The system may include a bias reduction engine that is configured to compare the first results of the first automated search with the second results of the second automated search to determine differences between the first results and the second results. The bias reduction engine may be configured to analyze the differences to determine whether the open source AI system or the closed source AI system is attempting to manipulate search results about the entity to inject a predetermined bias into the search results. The open source AI system may include a first AI algorithm that is publicly available and a first data set. The closed source AI system may include a second AI algorithm that is private and is not publicly available and a second data set. The bot may be an autonomous program operating on the bias reduction AI system that may interact with other systems or users.

The bias reduction engine may be configured to flag the predetermined bias based on a finding of a presence or absence of entries in the first results or the second results about the entity.

Upon a determination that the open source AI system or the closed source AI system is attempting to manipulate search results about the entity, the bot may be configured to reduce the predetermined bias about the entity at the open source AI system and the closed source AI system by sharing data about the entity between the open source AI system and the closed source AI system. The shared data may include data from data sets at the open source AI system or the closed source AI system. The AI bot may be configured to reduce bias by sharing search results between the open source AI system and the closed source AI system.

The predetermined bias within either of the open source AI system and the closed source AI systems may be reflected in a system-specific key that indicates whether or not to trust the open source AI system or the closed source AI system.

The bias reduction system may include a scoring engine that is configured to assign one or more scores to each of the open source AI system and the closed source AI system. The one or more scores may relate to a level of bias that has been determined based on a comparison of the first results and the second results.

The bias reduction system may include a certification engine that is configured to assign a certificate of trust to one or both of the open source AI system or the closed source AI system based on a value of the one or more scores relative to a predetermined threshold.

The open source AI system and the closed source AI system may be validated by nodes in a blockchain. The certification engine may be configured to analyze the blockchain. The certification engine may be configured to assign the certificate of trust to one or both of the open source and closed source AI systems that may be based on analyzing the blockchain. The analysis of the blockchain for the open source AI system and the closed source AI system may include analyzing one or more of a background, history, or a previous trust status.

The bias reduction system may include a third interface to an AI auditor system. The AI auditor system may include AI auditors and may be configured to operate at each of a plurality of nodes. The AI auditor system may analyze the open source AI system and the closed source AI system for the predetermined bias. The AI auditors may jointly affix an electronic signature to the open source AI system or the closed source AI system when no predetermined bias is found.

A bias reduction method may be provided in accordance with the present disclosure. The method may include performing a first automated search, using the open source AI system, for information about an entity to obtain first results. The method may include performing a second automated search, using a closed source AI system, for information about the entity to obtain second results. The first and second automated searches may use the same terminology.

The method may compare the first results of the first automated search with the second results of the second automated search to determine differences between the first results and the second results. The method may analyze the differences to determine whether the open source AI system or the closed source AI system is attempting to manipulate search results about the entity to inject a predetermined bias into the search results. The open source AI system may include a first AI algorithm that is publicly available and a first data set. The closed source AI system may include a second AI algorithm that is private and is not publicly available and a second data set.

Upon a determination that the open source AI system or the closed source AI system is attempting to manipulate search results about the entity, the method may reduce the predetermined bias about the entity at the open source AI system and the closed source AI system by sharing data about the entity between the open source AI system and the closed source AI system.

The method may include flagging the predetermined bias based on a finding of a presence or absence of entries in the first results or the second results about the entity. The method may include converting the predetermined bias within either of the open source AI system and the closed source AI systems into a system-specific key that indicates whether or not to trust the open source AI system or the closed source AI system.

The method may assign one or more scores to each of the open source AI system and the closed source AI system. The one or more scores may relate to a level of bias that has been determined based on a comparison of the first results and the second results.

The method may include assigning a certificate of trust to one or both of the open source AI system or the closed source AI system based on a value of the one or more scores relative to a predetermined threshold. The open source AI system and the closed source AI system may be validated by nodes in a blockchain. The method may include analyzing the blockchain and assigning the certificate of trust to one or both of the open source and closed source AI systems based on analyzing the blockchain. The analyzing of the blockchain for the open source AI system and the closed source AI system may include analyzing one or more of a background, history, or a previous trust status.

The method may include interfacing with an AI auditor system comprising AI auditors that operate at each of a plurality of nodes and analyze the open source AI system and the closed source AI system for the predetermined bias, wherein the AI auditors affix an electronic signature to the open source AI system or the closed source AI system when no predetermined bias is found.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
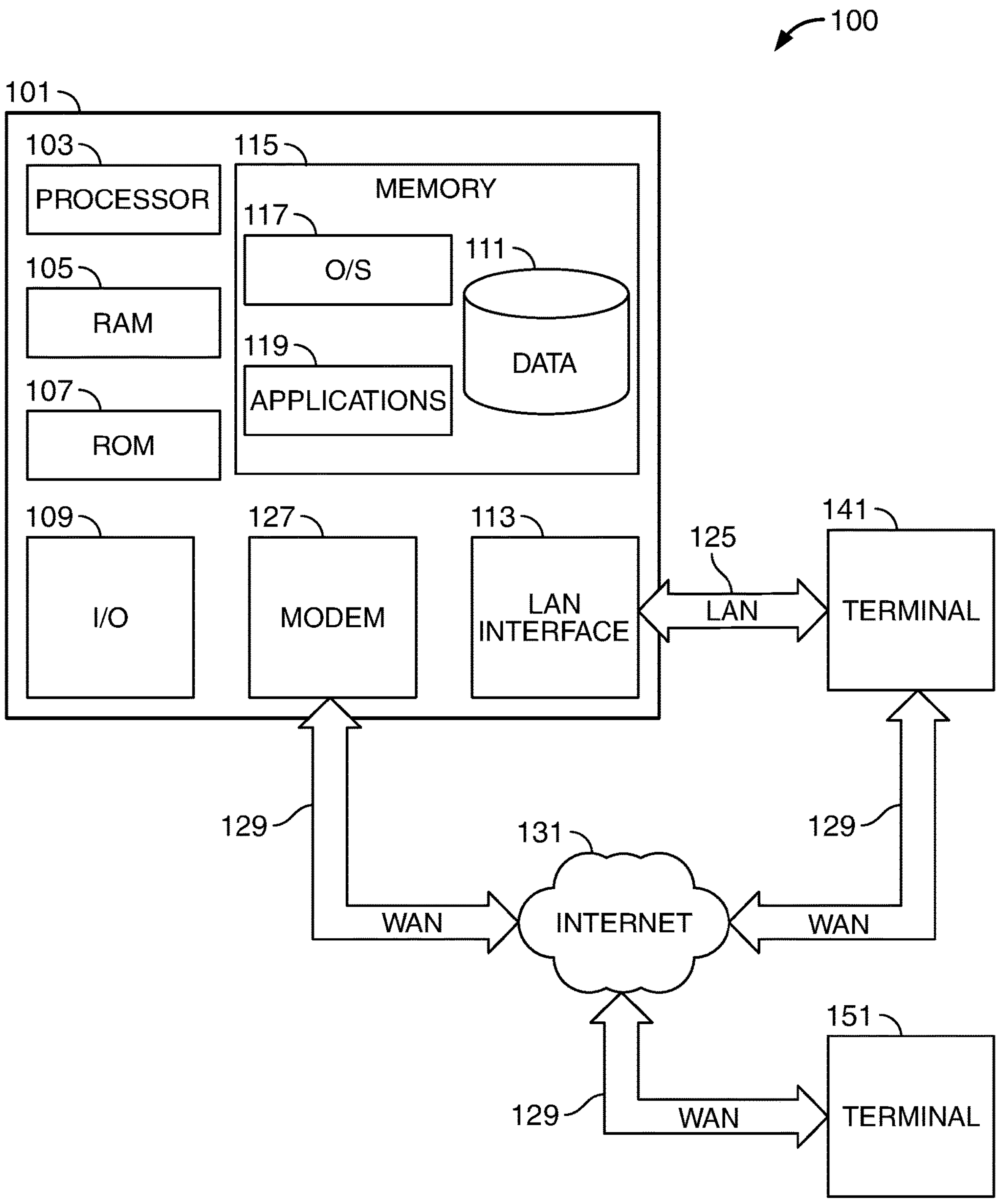
FIG. 1 shows an illustrative system architecture in accordance with principles of the disclosure.

The present disclosure relates to systems, methods, and apparatus for reducing biases about an entity in open source and closed source AI systems. The system, method and apparatus may attempt to learn whether one or both of the systems are attempting to manipulate search results about the entity to inject a predetermined bias and initiate bias reduction efforts through actions and incentivization toward reducing the detected bias. The entity may be a company, an organization, a person, a country or any other entity against which a bias may be exhibited.

Either of the open source and closed source AI systems may have a bias which may be inadvertently included or may be the result of attempts to intentionally add bias to the open source or closed source AI systems. The bias reduction AI system may interface with both open and closed source AI systems to reduce the biases and increase trust in the results of open source and closed source AI systems. A bias reduction AI system may learn from other existing AI systems, including both open source and closed source AI systems, to minimize bias.

The open source AI system may operate using an open source algorithm and a first data set. The closed source AI system may operate using a closed source algorithm and a second data set.

A bot at the AI system may run automated identical or similar searches on both the open source and closed source AI systems. The searches may relate to an entity. The searches may be run by an operator of the closed source AI system or by a system with access to the closed source AI system, such as one or more AI-implemented auditor engines that may audit another AI system for biases.

The results of a search on the open source AI system may be compared with results of a search on the closed source AI system to and differences between the results of the searches may be analyzed to determine whether the open source AI system or the closed source AI system is attempting to manipulate search results about the entity to inject a predetermined bias into the search results.

As an example, the bias reduction AI system may determine that one of the open source AI system or closed source AI system has a predetermined bias about an entity when one of these systems outputs only positive or only negative search results about the entity and the other system includes both positive and negative results.

The bias reduction AI system may include a bias reduction engine that compares the search results and may determine bias reduction measures. The bias reduction measures may be based on an analysis of the closed source AI system and may be able to identify and reduce its predetermined biases at the closed source AI system by interacting with the open source AI system and modify the machine learning algorithm at the closed source AI system. The open source AI system may be able to identify and reduce its predetermined biases by interacting with the closed source AI system and modify the machine learning algorithm at the open source AI system.

Once the systems interact to root out biases, the level of trust for future interactions between the two systems may be increased. To incentivize AI systems to reduce bias, the level of trust may be reflected in a certification, scoring, auditing, or other motivational mechanism that may be established to reflect a level of bias in either the open source AI system or the closed source AI system.

For example, an electronic certificate (key) corresponding to the AI system may be created to reflect a level of trust in the AI system. If a predetermined bias toward an entity is detected at one of the open source or closed source AI systems and the bias has been addressed or if no bias has been detected at one of the open source or closed source AI systems, the electronic certificate for that AI system may be created.

As another example, a scoring model may be used to score the machine learning models of the open source AI system and closed source AI system. The scores may be used by the open source AI system or the closed source AI system to determine whether to update the machine learning models at the respective AI systems.

One or more AI-implemented auditors may be configured to audit another AI system for biases may analyze any determinations of bias or lack of bias in the open source AI system and the close source AI system. Each of the one or more of the AI-implemented auditors may generate an electronic signature to be associated with one or both of the open source AI system and closed source AI system that has no bias or reduced bias that may be below a threshold. Where there are multiple AI-implemented auditors, a supervisory AI-implemented auditor may provide oversight over the multiple AI-implemented auditors.

Illustrative embodiments of methods, systems, and apparatus in accordance with the principles of the invention will now be described with reference to the accompanying drawings, which form a part hereof. It is to be understood that other embodiments may be used, and structural, functional, and procedural modifications may be made without departing from the scope and spirit of the present invention.

The drawings show illustrative features of methods, systems, and apparatus in accordance with the principles of the invention. The features are illustrated in the context of selected embodiments. It will be understood that features shown in connection with one of the embodiments may be practiced in accordance with the principles of the invention along with features shown in connection with another of the embodiments.

The methods, apparatus, computer program products, and systems described herein are illustrative and may involve some or all the steps of the illustrative methods and/or some or all of the features of the illustrative system or apparatus. The steps of the methods may be performed in an order other than the order shown or described herein. Some embodiments may omit steps shown or described in connection with the illustrative methods. Some embodiments may include steps that are not shown or described in connection with the illustrative methods, but rather are shown or described in a different portion of the specification.

FIG. 1 shows an illustrative block diagram of system 100 that includes computer 101. Computer 101 may alternatively be referred to herein as an "engine," "server" or a "computing device." Computer 101 may be any computing device described herein, such as the computing devices running on a computer, smart phones, smart cars, smart cards, and any other mobile device described herein. Elements of system 100, including computer 101, may be used to implement various aspects of the systems and methods disclosed herein.

Computer 101 may have a processor 103 for controlling the operation of the device and its associated components, and may include RAM 105, ROM 107, input/output circuit 109, and a non-transitory or non-volatile memory 115. Machine-readable memory may be configured to store information in machine-readable data structures. Other components commonly used for computers, such as EEPROM or Flash memory or any other suitable components, may also be part of the computer 101.

Memory 115 may be comprised of any suitable permanent storage technology—e.g., a hard drive. Memory 115 may store software including the operating system 117 and application(s) 119 along with any data 111 needed for the operation of computer 101. Memory 115 may also store videos, text, and/or audio assistance files. The data stored in Memory 115 may also be stored in cache memory, or any other suitable memory.

Input/output ("I/O") module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

Computer 101 may be connected to other systems via a local area network (LAN) interface 113. Computer 101 may operate in a networked environment supporting connections to one or more remote computers, such as terminals 141 and 151. Terminals 141 and 151 may be personal computers or servers that include many or all the elements described above relative to computer 101.

In some embodiments, computer 101 and/or Terminals 141 and 151 may be any of mobile devices that may be in electronic communication with consumer device 106 via LAN, WAN, or any other suitable short-range communication when a network connection may not be established.

When used in a LAN networking environment, computer 101 is connected to LAN 125 through a LAN interface 113 or an adapter. When used in a WAN networking environment, computer 101 may include a communications device, such as modem 127 or other means, for establishing communications over WAN 129, such as Internet 131.

In some embodiments, computer 101 may be connected to one or more other systems via a short-range communication network (not shown). In these embodiments, computer 101 may communicate with one or more other terminals 141 and 151, such as the mobile devices described herein etc., using a personal area network (PAN) such as Bluetooth®, NFC (Near Field Communication), ZigBee, or any other suitable personal area network.

It will be appreciated that the network connections shown are illustrative and other means of establishing a communications link between computers may be used. The existence of various well-known protocols such as TCP/IP, Ethernet, NFT, HTTP, and the like is presumed, and the system can be operated in a client-server configuration to permit retrieval of data from a web-based server or API (Application Programming Interface). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application programs 119 may use one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may use the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 119 may include one or more algorithms that may be used to implement features of the disclosure.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to computer 101 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smartphones, multiprocessor systems, microprocessor-based systems, cloud-based systems, programmable consumer electronics, network PCs, minicomputers, mainframe computers, distributed computing environments that include any of the above systems or devices, and the like.

Figure 2:
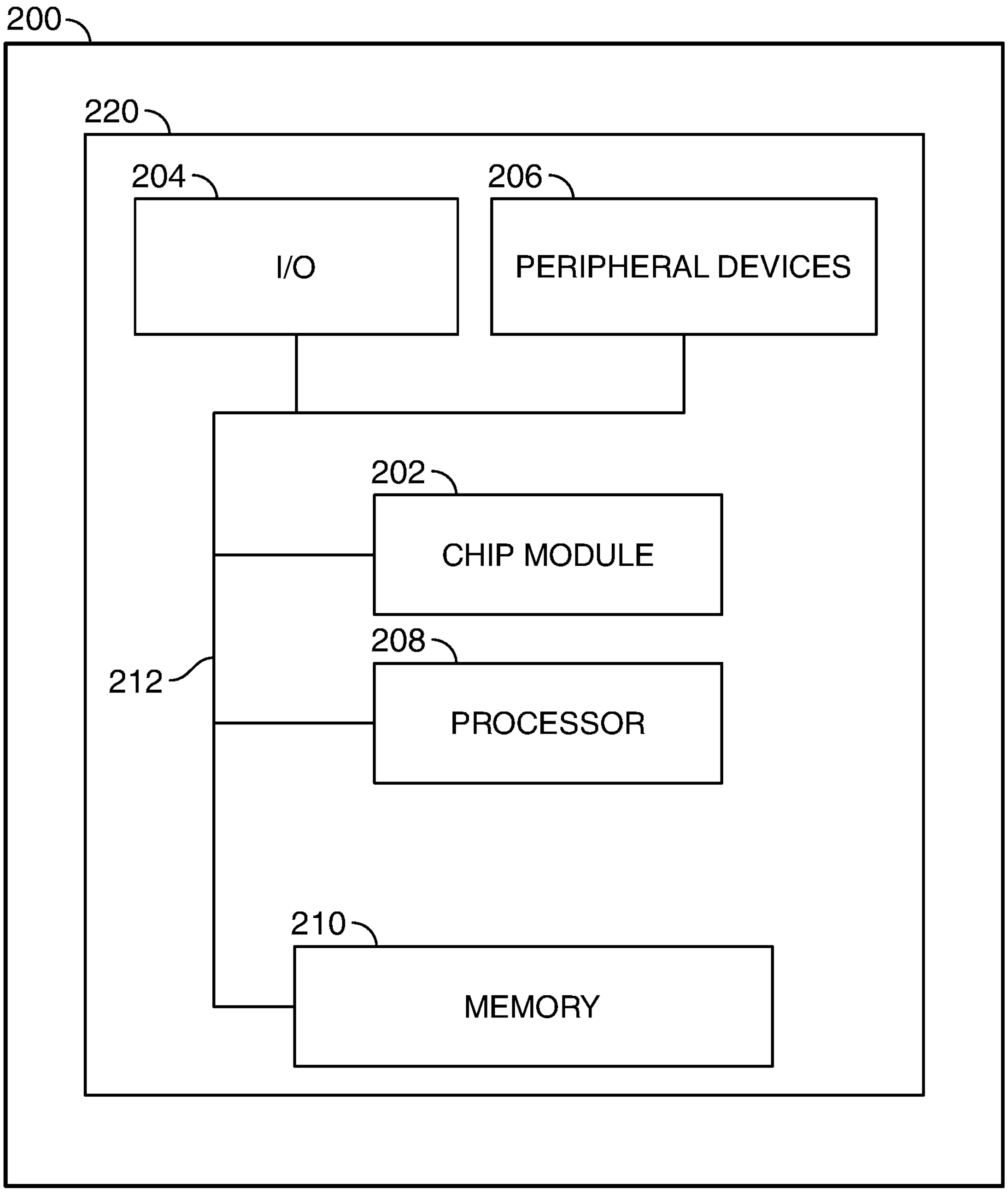
FIG. 2 shows an illustrative apparatus of a device in accordance with principles of the disclosure.

FIG. 2 shows illustrative apparatus 200, which may be a computing device. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
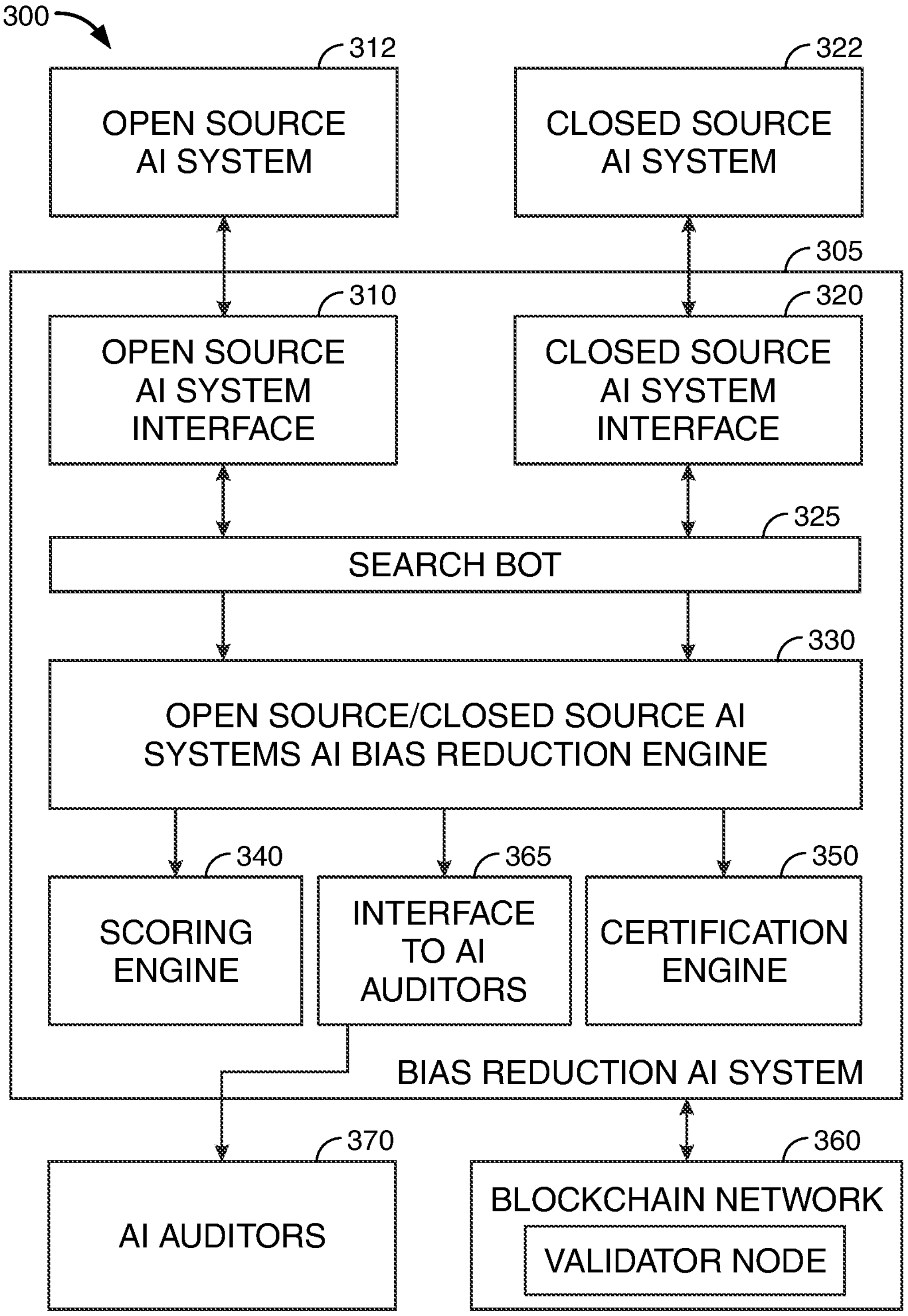
FIG. 3 shows an illustrative system for determining and reducing biases in open source and closed source AI engines to provide better results in accordance with principles of the disclosure.

FIG. 3 shows an illustrative system 300 for reducing predetermined bias about an entity in open source and closed source AI systems. System 300 may include a bias reduction AI system 305 that may be used to reduce the predetermined bias about the entity.

Bias reduction AI system 305 may include a bot 325 that transmits a first search request for an automated search about the entity via an open source AI system interface 310 to open source AI system 312. Bot 325 may be an autonomous program operating on bias reduction AI system 305 that may interact with other systems or users. The first search request may cause an automated search related to an entity to be run on open source AI system 312. The search may determine first AI-generated search results. Bot 325 may also transmit a second search request for an automated search about the entity via closed source AI system interface to closed source AI system 322. This may cause an automated search related to the entity on closed source AI system 322. The search may determine second AI-generated search results. The first and second automated searches may use the same terminology so that the same searches are run on both open source AI system 312 and closed source AI system 322. Bot 305 may be configured to assist in bias reduction efforts as described below.

Bias reduction AI system 305 may include a bias reduction engine 330 that is configured to compare the first search results of the first automated search with the second search results of the second automated search to determine differences between the first and second search results. Bias reduction engine 330 may also be configured to analyze the differences to determine whether the open source AI system or the closed source AI system is attempting to manipulate search results about the entity to inject a predetermined bias into the search results.

It is likely that there may be differences in the search results of the two systems 312 and 322 as the data sets may be different. Open source AI system 312 may provide search results that rely on publicly available data. Closed source AI system 322 may provide search results that rely on private data used as a data set to train a machine learning model at the closed source AI system 322. Also, open source AI system 312 may use a first AI algorithm that may be publicly available. Closed source AI system 322 may use a different AI algorithm.

Bias reduction engine 330 may consider various factors in determining whether there is a predetermined bias about an entity. As a few examples, factors that may be taken into account may include the extent of the discrepancy in results between the open source and closed source AI systems, such as a discrepancy in the number of search results (e.g., 5 results vs. 25 results) that were missing and the sources and content of the search results that were provided (e.g., were one set of search results expressed positive sentiment about the entity, while the other set of search results expressed a mix of sentiments), about the entity in the content of the search results, to name a few. Bias reduction engine 330 may be configured to flag the predetermined bias based on a finding of a presence or absence of entries in the first results or the second results about the entity.

Upon a determination by bias reduction engine 330 that the open source AI system 312 or the closed source AI system 322 may be attempting to manipulate search results about the entity, bias reduction engine 330 may cause bot 325 to attempt to reduce the predetermined bias about the entity that was identified. This may be performed by configuring bot 325 to share data about the entity or portions of data sets related to the entity between open source AI system 312 and closed source AI system 322. Interactions between open source AI system 312 and closed source AI system may be triggered. The sharing of data or triggering of interactions may cause each of the open source and closed source AI systems 312, 314 to become aware of the differences in search results and biases to update the first and second data sets and may cause them to learn to reduce the predetermined biases about the entity.

Bias reduction AI system 305 may also incentivize bias reduction efforts by the open source AI system 312 and closed source AI system 322 by issuing keys, certificate of trust, validating a system on the blockchain, and scoring that may become publicly associated with the AI systems 312, 322.

The predetermined bias within either of the open source AI system and the closed source AI systems may be reflected in a system-specific key that may be generated and may indicate whether or not to trust open source AI system 312 or the closed source AI system 322.

Bias reduction AI system 305 may also include a scoring engine 340 and a certification engine 350. Scoring engine 340 may receive search results of searches performed by open source AI system 312 and closed source AI system 322 and may assign one or more scores to each of open source AI system 312 and closed source AI system 322. The one or more scores relate to a level of bias that has been determined based on a comparison of the results of the searches of each AI system.

Certification engine 350 may assign a certificate of trust to one or both of open source AI system 312 or closed source AI system 322. The certification may be based on a value of the one or more scores relative to a predetermined threshold. For example, if a score is above a threshold of 80 on a scale of 0 to 100, certificate engine 350 may assign a certificate of trust.

Certification engine 350 may be configured to analyze the existing blockchain relating to open source AI system 312 and closed source AI system in a blockchain network 360. The assigning of the certificate of trust to one or both of the open source and closed source AI systems 312, 322 may be based on the analysis of the blockchain for the open source AI system or the closed source AI system. The analysis of the blockchain for the open source AI system and the closed source AI system may include an analysis of one or more of a background, history, or a previous trust status of the respective AI system.

Upon a determination that the current predetermined bias of open source AI system 312 or closed source AI system 322 is low, the respective open source or closed source AI system may be validated by nodes in a blockchain network 360, such as validator nodes, and the blockchain may be updated.

Bias removal AI system 305 may also include an interface 365 to an AI auditor system 370. Auditor system 370 may include AI auditors each of which may operate at one of a plurality of nodes, to analyze open source AI system 312 and closed source AI system 322 for predetermined bias. Auditor system 370 may jointly affix an electronic signature to open source AI system 312 or closed source AI system 322 when no predetermined bias about an entity is found.

Figure 4:
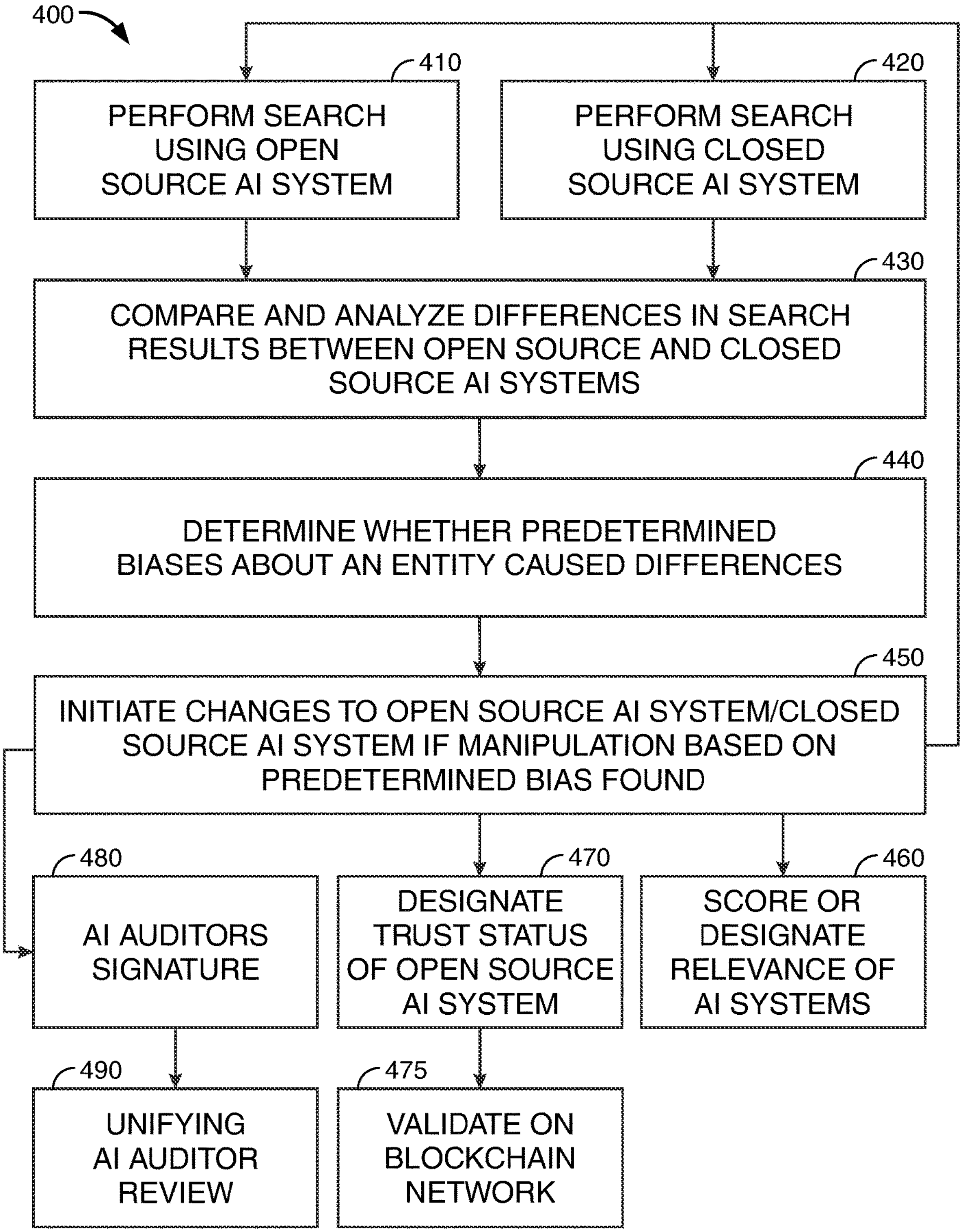
FIG. 4 shows an illustrative example of a flow chart for performing a method for determining and reducing biases in open source and closed source AI engines in accordance with principles of the disclosure.

FIG. 4 shows an illustrative example of a flow chart 400 for using a bias reduction AI system to determine whether an open source AI system or the closed source AI system is attempting to manipulate search results about an entity to inject a predetermined bias into the search results and to reduce the bias if found.

At step 410, a first search about an entity may be performed using an open source AI system. At step 420, a second search about the entity may be performed using a closed source AI system. Steps 410 and 420 may be performed by a bot. At step 430, the search results for the first and second searches may be compared and analyzed for attempted manipulation of the search results by the open source or closed source AI systems for predetermined bias.

At step 440, a determination may be made whether any biases about an entity causes the differences. The amount of predetermined bias about the entity may be assessed by the bias reduction AI system based on various factors. For example, factors that may be taken into account may include the extent of the discrepancy in results between the open source and closed source AI systems, such as a discrepancy in the number of search results (e.g., 5 results vs. 25 results) that were missing and the sources and content of the search results that were provided (e.g., were one set of search results expressed positive sentiment about the entity, while the other set of search results expressed a mix of sentiments), about the entity in the content of the search results, to name a few.

At step 450, if predetermined bias is found, changes to the open source AI system and closed source AI system may be initiated by enabling interactions between the open source and closed source AI system. The interactions may include sharing the results of the searches so that each AI system may learn and may update the machine learning algorithms and models. Public data in the data sets may be shared between systems. After initiating changes to the open source AI source or the closed source AI system, the searches at 410, 420 may be optionally repeated to check whether risk has been reduced by changes made to the open source AI system or closed source AI system.

At step 460, one or more scores may be assigned by the bias reduction AI system to each of the open source or closed source AI systems. The scores may be based on a predetermined scale and may correspond to a level of predetermined bias that has been found at a respective one of the open source and closed source AI systems. For example, a scale of 1 to 10 may be used. The nature of the predetermined bias and the amount of bias identified may be considered in assigning a score. The scores may be a factor in determining whether to rely on the respective open source or closed source AI system. In embodiments, relevance of the open source AI system and the closed source AI system may be considered in using one or the other AI systems based on a determination of predetermined biases about an entity.

At step 470, if predetermined biases about an entity at the open-source AI system are determined to be below a predetermined threshold, the open-source AI system may be designated to have a trusted status by the AI system. This status may be noted by issuing a certificate of trust. Similarly, if predetermined biases at the closed-source AI system are determined to be below a predetermined threshold, the closed-source AI system may be designated to have a trusted status by the AI system. At step 475, a trusted open source or closed source AI system may be validated by a validator node on the blockchain network. The information recorded on the blockchain may include an analysis of one or more of a background, history, or a previous trust status.

At step 480, a plurality of AI auditor systems may analyze the search results. If the AI auditors systems find the results of the open source AI system or the closed source AI system to have a low level of predetermined bias about an entity, the AI auditors may generate an electronic signature certifying the finding. As a further step 490, a unifying AI auditor may review the findings before the electronic signature is associated with the open source AI system or the closed source AI system is made public.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods, systems, apparatuses, and computer program products may implement a reduction in predetermined biases about an entity in open source and closed source AI systems. Persons skilled in the art will appreciate that the present invention can be practiced by other than the described embodiments, which are presented for purposes of illustration rather than of limitation.

What is claimed is:

1. A bias reduction artificial intelligence (AI) system, the system comprising:

a processor;

a first interface to an open source AI system;

a second interface to a closed source AI system;

a bot that is configured to, using the processor:

perform a first automated search, using the open source AI system, for information about an entity to obtain first search results; and perform a second automated search, using a closed source AI system, for information about the entity to obtain second search results, wherein the first and second automated searches are performed using the same search terminology; and a bias reduction engine that is configured to:

compare the first search results of the first automated search with the second search results of the second automated search to determine differences between the first search results and the second search results; and analyze the differences, using AI, to determine whether the open source AI system or the closed source AI system is manipulating or attempting to manipulate search results, including the first search results or the second search results, about the entity to inject a predetermined bias into the search results;

wherein:

the open source AI system comprises a first AI algorithm that is publicly available and a first data set;

the closed source AI system comprises a second AI algorithm that is private and is not publicly available and a second data set; and the bot is an autonomous program operating on the bias reduction AI system.

2. The system of claim 1, wherein, upon a determination that the open source AI system or the closed source AI system is attempting to manipulate search results about the entity, the bot is further configured to reduce the predetermined bias about the entity at the open source AI system and the closed source AI system by sharing data about the entity between the open source AI system and the closed source AI system.

3. The system of claim 1, wherein the bias reduction engine is further configured to flag the predetermined bias based on a finding of a presence or absence of entries in the first search results or the second search results about the entity.

4. The system of claim 1, wherein the predetermined bias within either of the open source AI system and the closed source AI systems may be is reflected in a system-specific key that is generated to indicate whether or not to trust the open source AI system or the closed source AI system.

5. The system of claim 1, further comprising a scoring engine that is configured to assign one or more scores to each of the open source AI system and the closed source AI system, wherein the one or more scores relate to a level of bias that has been determined based on a comparison of the first search results and the second search results.

6. The system of claim 1, further comprising a certification engine that is configured to assign a certificate of trust to one or both of the open source AI system or the closed source AI system based on a value of one or more scores relative to a predetermined threshold.

7. The system of claim 6, wherein the open source AI system and the closed source AI system are validated by nodes in a blockchain.

8. The system of claim 7, wherein the certification engine is further configured to analyze the blockchain, and the assigning of the certificate of trust to one or both of the open source AI system and the closed source AI system is based on analysis of the blockchain.

9. The system of claim 7, wherein the analyzing of the blockchain for the open source AI system and the closed source AI system includes analyzing of one or more of a background, history, or a previous trust status.

10. The system of claim 1, further comprising:

a third interface to an AI auditor system comprising AI auditors and configured to operate at each of a plurality of nodes, to analyze the open source AI system and the closed source AI system for the predetermined bias, and to jointly, by the AI auditors, affix an electronic signature to the open source AI system or the closed source AI system when no predetermined bias is found.

11. A method for bias reduction on AI systems, the method comprising:

performing a first automated search, using an open source AI system, for information about an entity to obtain first search results;

performing a second automated search, using a closed source AI system, for information about the entity to obtain second search results, wherein the first and second automated searches are performed using the same search terminology;

comparing the first search results of the first automated search with the second search results of the second automated search to determine differences between the first search results and the second search results; and analyzing the differences, using AI, to determine whether the open source AI system or the closed source AI system is manipulating or attempting to manipulate search results, including the first search results or the second search results, about the entity to inject a predetermined bias into the search results;

wherein the open source AI system comprises a first AI algorithm that is publicly available and a first data set, and the closed source AI system comprises a second AI algorithm that is private and is not publicly available and a second data set.

12. The method of claim 11, further comprising:

upon a determination that the open source AI system or the closed source AI system is attempting to manipulate search results about the entity, reducing the predetermined bias about the entity at the open source AI system and the closed source AI system by sharing data about the entity between the open source AI system and the closed source AI system.

13. The method of claim 11, further comprising flagging the predetermined bias based on a finding of a presence or absence of entries in the first search results or the second search results about the entity.

14. The method of claim 11, further comprising:

generating an AI system-specific key that reflects the predetermined bias within either of the open source AI system and the closed source AI systems and indicates whether or not to trust the open source AI system or the closed source AI system.

15. The method of claim 11, further comprising:

assigning one or more scores to each of the open source AI system and the closed source AI system, wherein the one or more scores relate to a level of bias that has been determined based on a comparison of the first search results and the second search results.

16. The method of claim 11, further comprising:

assigning a certificate of trust to one or both of the open source AI system or the closed source AI system based on a value of one or more scores relative to a predetermined threshold.

17. The method of claim 16, wherein the open source AI system and the closed source AI system are validated by nodes in a blockchain.

18. The method of claim 17, further comprising analyzing the blockchain and assigning the certificate of trust to one or both of the open source AI system and the closed source AI system based on analysis of the blockchain.

19. The method of claim 17, wherein the analyzing of the blockchain for the open source AI system and the closed source AI system comprises analyzing one or more of a background, history, or a previous trust status.

20. The method of claim 11, further comprising:

interfacing with an AI auditor system comprising AI auditors that operate at each of a plurality of nodes and analyze the open source AI system and the closed source AI system for the predetermined bias, wherein the AI auditors affix an electronic signature to the open source AI system or the closed source AI system when no predetermined bias is found.

* * * * *